W. H. SHUGART.
Sawing-Machines.
No. 141,959.  Patented August 19, 1873.
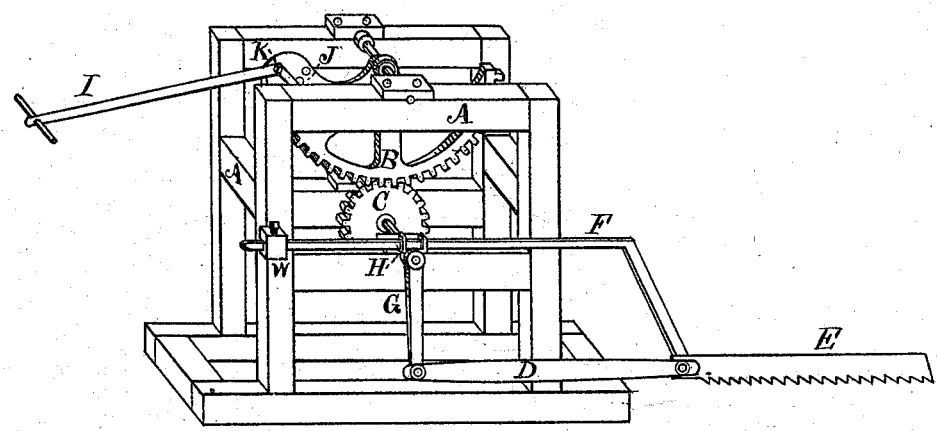
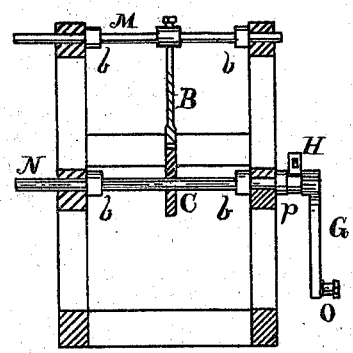
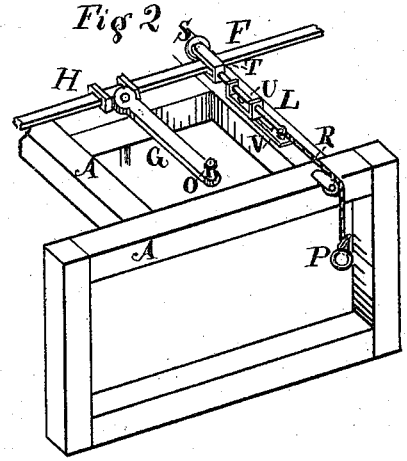
Witnesses
Nelson A. Hunt
Caleb Elliott
Inventor
William H Shugart
By J. B. Hunt Atty

UNITED STATES PATENT OFFICE.

WILLIAM H. SHUGART, OF NEW GARDEN, INDIANA.

IMPROVEMENT IN SAWING-MACHINES.

Specification forming part of Letters Patent No. 141,959, dated August 19, 1873; application filed May 31, 1873.

*To all whom it may concern:*

Be it known that I, WILLIAM H. SHUGART, of New Garden, county of Wayne and State of Indiana, have invented certain Improvements in Sawing-Machines, of which the following is a specification:

My invention relates to an improvement in hand drag-saws, arranged in such manner as to be applicable to other purposes, such as churning and purposes of a kindred nature.

Figure 1 is a perspective view. Fig. 2 is a perspective view of a portion of the frame, the same being turned upon its side, as when in use for sawing down standing trees, and showing the attachments for feeding the saw into the tree. Fig. 3 is a vertical cross-section, showing the adjusting-collars $b\ b\ b\ b$ attached to the shafts.

A is the frame. B is the driving wheel or segment. C is the pinion attached to the crank-shaft. D is the pitman, attached to the crank G and to the saw E. F is a balancing-lever, also attached to the saw, and passing through the loop H attached to the crank-shaft. The weight W serves as a balance to the saw, and, by shifting, will give greater or less weight upon the saw, as desired.

When it is desired to use the machine for felling trees, it is turned down upon its side, as shown in Fig. 2, and the feeding device attached, when the weight P attached to the cord R draws the roller S against the bar F, which draws the saw against the standing tree.

The roller S is attached to the loop T. The rod L is also attached to said loop, the cord R being attached to the outer end of the rod, said rod passing through the loop U, which loop is attached to the slotted plate V for adjustment.

The height at which a standing tree may be cut is regulated by shifting the collars $b\ b\ b\ b$ upon their shafts, as may be desired. The lever or handle by which the machine is operated is also adjustable by means of the screw-bolt K and a pin in the inner end of the lever I, which pin falls into the holes J to adjust the lever to any required position.

I do not wish to confine myself strictly to sawing timber with my machine, as it may be applied, with equal facility, to a variety of purposes, such as churning, sawing stone, &c.

By shifting the crank G to operate in a horizontal position the motion of the crank-pin O will be vertical instead of horizontal, and its application to a churn or the like is made very easy.

Having thus fully described my invention, what I claim, and desire to secure by Letters Patent, is—

The frame A, provided with the segmental gear B, pinion C, and crank G, in combination with the saw E and its operating and guiding mechanism, substantially as specified.

WILLIAM H. SHUGART.

Witnesses:
CALEB ELLIOTT,
NELSON A. HUNT.